US009697165B2

(12) United States Patent
Yu

(10) Patent No.: US 9,697,165 B2
(45) Date of Patent: Jul. 4, 2017

(54) SERVER SYSTEM FOR SYNCHRONIZING MEMORY DATA OF MOTHERBOARDS

(71) Applicants: INVENTEC (PUDONG) TECHNOLOGY CORPORATION, Shanghai (CN); INVENTEC CORPORATION, Taipei (TW)

(72) Inventor: Xiong-Jie Yu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 370 days.

(21) Appl. No.: 14/473,315

(22) Filed: Aug. 29, 2014

(65) Prior Publication Data

US 2015/0370749 A1 Dec. 24, 2015

(30) Foreign Application Priority Data

Jun. 18, 2014 (CN) .......................... 2014 1 0272619

(51) Int. Cl.
*G06F 13/42* (2006.01)
*G06F 13/40* (2006.01)

(52) U.S. Cl.
CPC ...... *G06F 13/4243* (2013.01); *G06F 13/4022* (2013.01); *G06F 13/4221* (2013.01); *G06F 13/4068* (2013.01); *G06F 2213/0026* (2013.01)

(58) Field of Classification Search
CPC ............. G06F 13/4022; G06F 13/4045; G06F 13/4221; G06F 2213/0026
See application file for complete search history.

(56) References Cited

U.S. PATENT DOCUMENTS

| 7,676,707 | B2 * | 3/2010 | He | G06F 11/221 714/714 |
| 7,894,195 | B2 * | 2/2011 | Lin | G06F 1/184 361/727 |
| 8,296,476 | B2 * | 10/2012 | Zhang | G06F 3/0626 710/17 |
| 8,327,039 | B2 | 12/2012 | Chou et al. | |

(Continued)

FOREIGN PATENT DOCUMENTS

| CN | 102255958 | 11/2011 |
| TW | 201347473 | 11/2013 |

*Primary Examiner* — Brian Misiura
(74) *Attorney, Agent, or Firm* — Kirton McConkie; Evan R. Witt

(57) ABSTRACT

A server system is described. The server system comprises first motherboard having first processor module coupled to first memory module, second motherboard having second processor module coupled to second memory module, first back plate having first PCIE switch chip coupled to second PCIE switch chip via PCIE transmission channel. The first processor module is coupled to the first PCIE switch chip and the second processor module is coupled to the second PCIE switch chip. The first processor module converts the memory data of the first memory module into PCIE packet data to be transmitted to the second processor module by first PCIE switch chip and second PCIE switch chip. The second processor module converts the received PCIE packet data into memory data of second memory module for synchronizing the memory data of first motherboard and the second motherboard.

9 Claims, 3 Drawing Sheets

(56) References Cited

U.S. PATENT DOCUMENTS

| | | | | |
|---|---|---|---|---|
| 8,463,977 B2* | 6/2013 | Cooper | ............... | G06F 13/4022 |
| | | | | 710/104 |
| 8,719,490 B2* | 5/2014 | Yang | ...................... | G06F 3/061 |
| | | | | 711/100 |
| 8,880,768 B2* | 11/2014 | Mathew | .............. | G06F 13/4221 |
| | | | | 710/20 |
| 8,886,885 B2* | 11/2014 | Zhou | ................... | G06F 12/0246 |
| | | | | 711/103 |
| 9,386,722 B2* | 7/2016 | Xu | ........................ | H05K 7/1492 |
| 9,402,328 B2* | 7/2016 | Xu | ........................ | H05K 7/1487 |
| 2013/0268619 A1 | 10/2013 | Vasudevan et al. | | |
| 2014/0297196 A1* | 10/2014 | Olson | ................... | G06F 19/22 |
| | | | | 702/19 |
| 2015/0156117 A1* | 6/2015 | Zhao | ................... | H04L 47/125 |
| | | | | 709/223 |
| 2015/0362982 A1* | 12/2015 | Yu | ........................ | G06F 1/3287 |
| | | | | 713/323 |

\* cited by examiner

SERVER SYSTEM FOR SYNCHRONIZING MEMORY DATA OF MOTHERBOARDS

FIELD OF THE INVENTION

The present invention relates to a cluster system, and more particularly to a server system for synchronizing the memory data of the motherboards of computing system.

BACKGROUND OF THE INVENTION

With the rapid development of computer system technology, there is the continuous technological advancement of hardware equipment with high computing performance. Currently, cluster system is widely applicable to high performance computing field increasingly. The cluster system is a unit system which integrates a plurality of independent servers in the network domain and is managed based on unity mode to provide reliable services for client's workstation. The operating system and application program file of each server are stored in the local storage. When one server in one node malfunctions, another server in another node takes over all the application programs executed in the one server. If an application program service in the one server causes failure, the application program service is re-started or taken over by another server. Therefore, it is very important to synchronize the memory data of the servers.

Referring to FIG. 1, it is a schematic view of a conventional "2U" or "4U" cluster system. The memory data of two motherboards are synchronized by redundant motherboards therebetween while employing a conventional network interface card (NIC) and software. For the purpose of higher transmission bandwidth and rapid response time, most of the cluster systems adopt the NIC, i.e. network adapter, with 10G to implement the data synchronization wherein the bandwidth reaches 20G per second. As shown in FIG. 1, the first motherboard 11 includes a first NIC 112 with 10G and the second motherboard 13 includes a second NIC 132 with 10G. The first NIC 112 is connected to the second NIC 132 by way of the network cables. The central processing units (CPUs) and NICs in each motherboard are compatible to Peripheral Component Interconnect Express (hereinafter PCIE). While synchronizing the memory data, it is required to transmit the PCIE packet data of first CPU 111 in one, e.g. the first motherboard 111, of motherboards to the first NIC 112. The first NIC 112 converts the PCIE packet data to network packet data to be synchronized with the second NIC 132 of the second motherboard 13. In other words, the PCIE packet data is regarded as general PCIE data and the general PCIE data are re-packaged to form network packets according to network packet protocol wherein the network packets occupy a lot of bits. The second NIC 132 of the second motherboard 13 converts the network packets into PCIE packet data to be sent to the second CPU 131 of the second motherboard 13. The drawbacks of the aforementioned system are the NIC with 10G additionally disposed in each motherboard and the packet conversion, which wastes approximately 20% of data transmission bandwidth.

SUMMARY OF THE INVENTION

To improve the drawbacks of the aforementioned conventional system including the NIC with 10G additionally disposed in each motherboard and the packet conversion, which wastes approximately 20% of data transmission bandwidth, the present invention is to provide a server system for clustering the PCIE switch chips on the back plate and directly interconnecting two redundant motherboards by the PCIE switch chips in order to transmit the synchronization data for synchronizing the memory data and effectively reducing the consumption of data transmission bandwidth.

According to the above objective, the present invention sets forth a server system comprising: a first motherboard having at least one first processor module and at least one first memory module, wherein the at least one first processor module is electrically coupled to the at least one first memory module by way of a memory transmission channel; a second motherboard having at least one second processor module and at least one second memory module, wherein the at least one second processor module is electrically coupled to the at least one second memory module by way of a memory transmission channel; and a first back plate having at least one first PCIE switch chip and at least one second PCIE switch chip, wherein the at least one first PCIE switch chip is electrically coupled to the at least one second PCIE switch chip by way of a PCIE transmission channel; wherein the at least one first processor module is electrically coupled to the at least one first PCIE switch chip by way of the PCIE transmission channel, the at least one second processor module is electrically coupled to the at least one second PCIE switch chip by way of the PCIE transmission channel, the at least one first processor module converts memory data of the at least one first memory module into PCIE packet data to be transmitted to the at least one second processor module via the at least one first PCIE switch chip and the at least one second PCIE switch chip sequentially, and the at least one second processor module transforms the received PCIE packet data into memory data of the at least one second memory module for synchronizing the memory data of the at least one first memory module of the first motherboard with the memory data of the at least one second memory module of the second motherboard.

In one embodiment of the server system, the at least one second processor module converts memory data of the at least one second memory module into PCIE packet data to be transmitted to the at least one first processor module via the at least one second PCIE switch chip and the at least one first PCIE switch chip sequentially, and the at least one first processor module transforms the received PCIE packet data into memory data of the at least one first memory module for synchronizing the memory data of the at least one first memory module of the first motherboard with the memory data of the at least one second memory module of the second motherboard.

In one embodiment of the server system, the at least one first processor module comprises a first PCIE control unit, the at least one second processor module comprises a second PCIE control unit, and the first PCIE control unit and the second PCIE control unit are used to control transformation operation between the PCIE packet data and the memory data.

In one embodiment of the server system, the at least one first processor module and the at least one second processor module are a central processing unit (CPU) respectively.

In one embodiment of the server system, the server system further comprises a PCIE switch chip driver for analogizing the at least one first PCIE switch chip and/or the at least one second PCIE switch chip to a network interface card apparatus.

In one embodiment of the server system, the server system further comprises an operating system having a management module for calling the PCIE switch chip driver to be analogized to a driver of the network interface card apparatus by using a modifying parameter setting in order to share the management module with the PCIE switch chip driver and the driver of the network interface card apparatus so that the server system invokes the driver of the network interface card apparatus for synchronizing the memory data of the at least one first memory module of the first motherboard with the memory data of the at least one second memory module of the second motherboard.

In one embodiment of the server system, the modifying parameter setting comprises a modifying bandwidth and a device identifier.

In one embodiment of the server system, the first motherboard and the second motherboard are mutually redundant.

In another embodiment of the server system, the server system further comprises: a third motherboard having at least one third processor module and at least one third memory module, wherein the at least one third processor module is electrically coupled to the at least one third memory module by way of the memory transmission channel; a second back plate having at least one third PCIE switch chip and at least one fourth PCIE switch chip, wherein the at least one third PCIE switch chip is electrically coupled to the at least one fourth PCIE switch chip by way of the PCIE transmission channel; and a third back plate having at least one fifth PCIE switch chip and at least one sixth PCIE switch chip, wherein the at least one fifth PCIE switch chip is electrically coupled to the at least one sixth PCIE switch chip by way of the PCIE transmission channel; wherein the at least one first processor module is electrically coupled to the at least one third PCIE switch chip by way of the PCIE transmission channel, the at least one third processor module is electrically coupled to the at least one fourth PCIE switch chip by way of the PCIE transmission channel, the at least one first processor module converts the memory data of the at least one first memory module into PCIE packet data to be transmitted to the at least one third processor module via the at least one third PCIE switch chip and the at least one fourth PCIE switch chip sequentially, and the at least one third processor module transforms the received PCIE packet data into the memory data of the at least one third memory module for synchronizing the memory data of the at least one first memory module of the first motherboard with the memory data of the at least one third memory module of the third motherboard; and wherein the at least one second processor module is electrically coupled to the at least one fifth PCIE switch chip by way of the PCIE transmission channel, the at least one third processor module is electrically coupled to the at least one sixth PCIE switch chip by way of the PCIE transmission channel, the at least one second processor module converts the memory data of the at least one second memory module into PCIE packet data to be transmitted to the at least one third processor module via the at least one fifth PCIE switch chip and the at least one sixth PCIE switch chip sequentially, and the at least one third processor module transforms the received PCIE packet data into the memory data of the at least one third memory module for synchronizing the memory data of the at least one second memory module of the second motherboard with the memory data of the at least one third memory module of the third motherboard.

Still in another embodiment of the server system, the server system further comprises: a fourth motherboard having at least one fourth processor module and at least one fourth memory module, wherein the at least one fourth processor module is electrically coupled to the at least one fourth memory module by way of the memory transmission channel; a fourth back plate having at least one seventh PCIE switch chip and at least one eighth PCIE switch chip, wherein the at least one seventh PCIE switch chip is electrically coupled to the at least one eighth PCIE switch chip by way of the PCIE transmission channel; a fifth back plate having at least one ninth PCIE switch chip and at least one tenth PCIE switch chip, wherein the at least one ninth PCIE switch chip is electrically coupled to the at least one tenth PCIE switch chip by way of the PCIE transmission channel; and a sixth back plate having at least one eleventh PCIE switch chip and at least one twelfth PCIE switch chip, wherein the at least one eleventh PCIE switch chip is electrically coupled to the at least one twelfth PCIE switch chip by way of the PCIE transmission channel; wherein the at least one first processor module is electrically coupled to the at least one seventh PCIE switch chip by way of the PCIE transmission channel, the at least one fourth processor module is electrically coupled to the at least one eighth PCIE switch chip by way of the PCIE transmission channel, the at least one first processor module converts the memory data of the at least one first memory module into PCIE packet data to be transmitted to the at least one fourth processor module via the at least one seventh PCIE switch chip and the at least one eighth PCIE switch chip sequentially, and the at least one fourth processor module transforms the received PCIE packet data into the memory data of the at least one fourth memory module for synchronizing the memory data of the at least one first memory module of the first motherboard with the memory data of the at least one fourth memory module of the fourth motherboard; wherein the at least one second processor module is electrically coupled to the at least one ninth PCIE switch chip by way of the PCIE transmission channel, the at least one fourth processor module is electrically coupled to the at least one tenth PCIE switch chip by way of the PCIE transmission channel, the at least one second processor module converts the memory data of the at least one second memory module into PCIE packet data to be transmitted to the at least one fourth processor module via the at least one ninth PCIE switch chip and the at least one tenth PCIE switch chip sequentially, and the at least one fourth processor module transforms the received PCIE packet data into the memory data of the at least one fourth memory module for synchronizing the memory data of the at least one second memory module of the second motherboard with the memory data of the at least one fourth memory module of the fourth motherboard; and wherein the at least one third processor module is electrically coupled to the at least one eleventh PCIE switch chip by way of the PCIE transmission channel, the at least one fourth processor module is electrically coupled to the at least one twelfth PCIE switch chip by way of the PCIE transmission channel, the at least one third processor module converts the memory data of the at least one third memory module into PCIE packet data to be transmitted to the at least one fourth processor module via the at least one eleventh PCIE switch chip and the at least one twelfth PCIE switch chip sequentially, and the at least one fourth processor module transforms the received PCIE packet data into the memory data of the at least one fourth memory module for synchronizing the memory data of the at least one third memory module of the third motherboard with the memory data of the at least one fourth memory module of the fourth motherboard.

The advantage of the present invention is that the PCIE switch chips are clustered on the back plate for directly interconnecting two redundant motherboards by the PCIE switch chips in order to transmit the synchronization data for synchronizing the memory data and effectively reducing the consumption of data transmission bandwidth without packet conversion during synchronization step of memory data to minimize the network conversion delay during the transmission procedure. Moreover, it is not necessary to change the original structure of the application programs used in the upper layer to easily implement the server system of the present invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The following detailed description of server system is mentioned below when taken in conjunction with the accompanying drawings.

Figure 1:
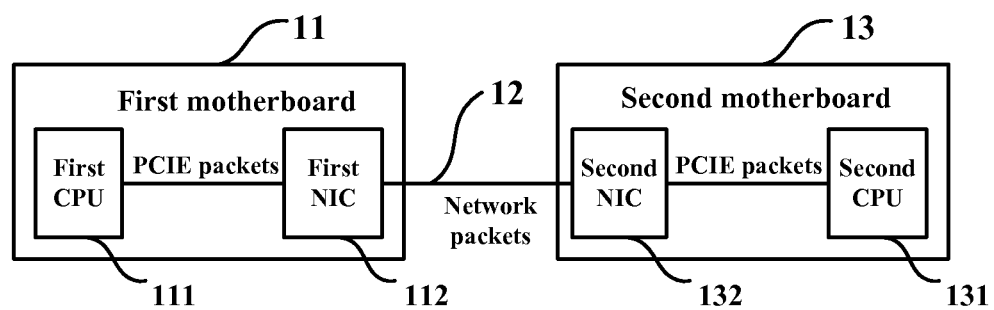
FIG. 1 is a schematic view of a conventional cluster system.
Figure 2:
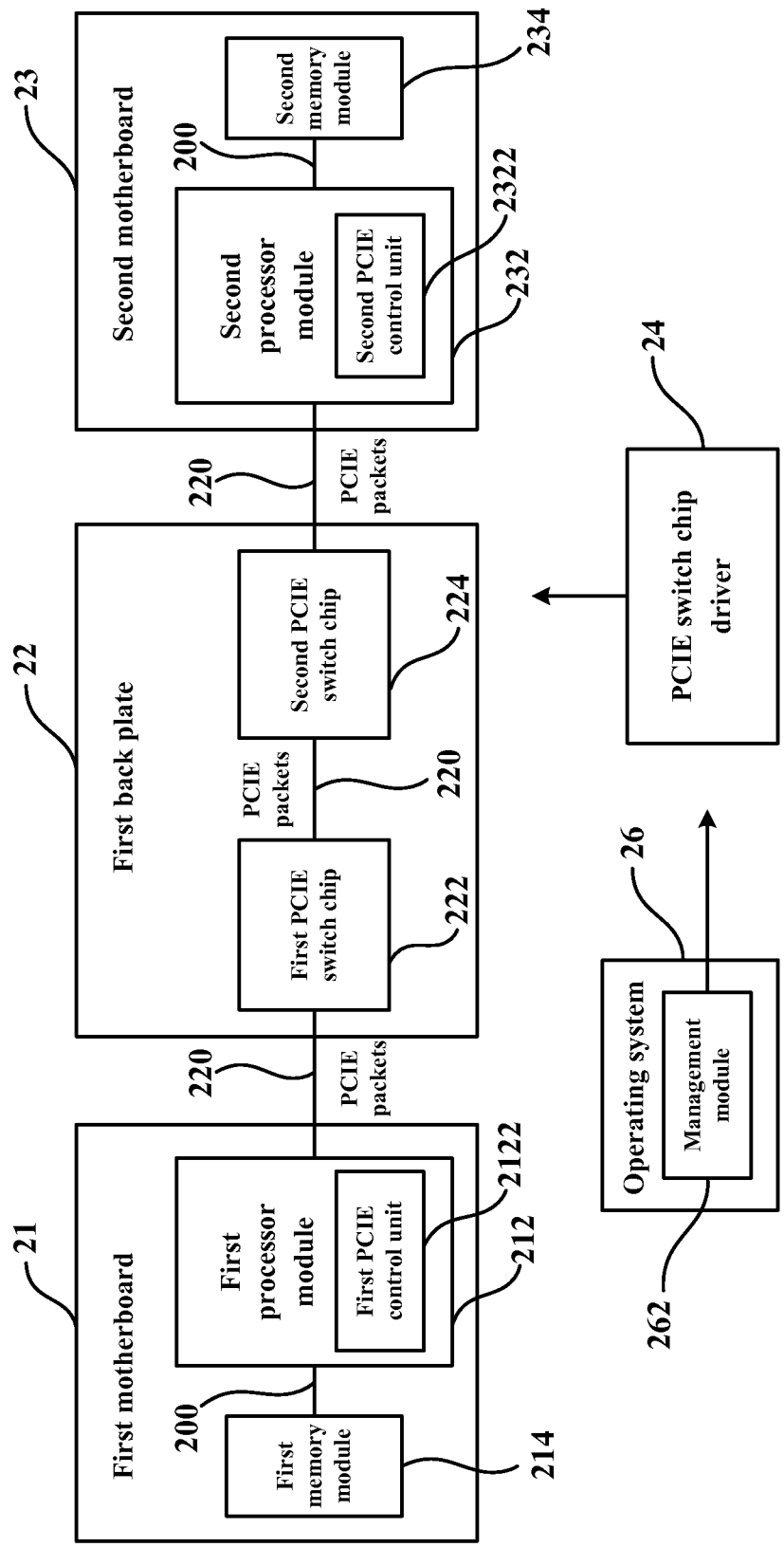
FIG. 2 is a schematic view of a server system according to one embodiment of the present invention.

FIG. 2 is a schematic view of a server system according to one embodiment of the present invention. The server system includes a first motherboard 21, a first back plate 22 and a second motherboard 23. The first motherboard 21 and the second motherboard 23 are redundant mutually.

The first motherboard 21 includes at least one first processor module 212 and at least one first memory module 214 (e.g. dual-inline-memory-modules). The at least one first processor module 212 is electrically coupled to the at least one first memory module 214 by way of a memory transmission channel 200. The second motherboard 23 includes at least one second processor module 232 and at least one second memory module 234. The at least one second processor module 232 is electrically coupled to the at least one second memory module 234 by way of a memory transmission channel 200. The first back plate 22 includes least one first PCIE switch chip 222 and at least one second PCIE switch chip 224. The at least one first PCIE switch chip 222 is electrically coupled to the at least one second PCIE switch chip 224 by way of a PCIE transmission channel 220.

The at least one first processor module 212 is electrically coupled to the at least one first PCIE switch chip 222 by way of the PCIE transmission channel 220. The at least one second processor module 232 is electrically coupled to the at least one second PCIE switch chip 224 by way of the PCIE transmission channel 220. The at least one first processor module 212 converts memory data of the at least one first memory module 214 into PCIE packet data to be transmitted to the at least one second processor module 232 via the at least one first PCIE switch chip 222 and the at least one second PCIE switch chip 224 sequentially. The at least one second processor module 232 transforms the received PCIE packet data into memory data of the at least one second memory module 234 for synchronizing the memory data of the at least one first memory module 214 of the first motherboard 21 with the memory data of the at least one second memory module 234 of the second motherboard 23.

Similarly, the at least one second processor module 232 converts memory data of the at least one second memory module 234 into PCIE packet data to be transmitted to the at least one first processor module 212 via the at least one second PCIE switch chip 224 and the at least one first PCIE switch chip 222 sequentially. The at least one first processor module 212 transforms the received PCIE packet data into memory data of the at least one first memory module 214 for synchronizing the memory data of the at least one first memory module 214 of the first motherboard 21 with the memory data of the at least one second memory module 234 of the second motherboard 23.

In one embodiment, the at least one first processor module 212 includes a first PCIE control unit 2122 for controlling transformation operation between the PCIE packet data and the memory data. The at least one second processor module 232 includes a second PCIE control unit 2322 for controlling transformation operation between the PCIE packet data and the memory data. For example, the at least one first processor module 212 and the at least one second processor module 232 are a central processing unit (CPU) respectively.

In one embodiment, the server system further includes a PCIE switch chip driver 24 for analogizing the at least one first PCIE switch chip 222 and/or the at least one second PCIE switch chip 224 to a network interface card (NIC) apparatus.

In one embodiment, the server system further includes an operating system 26 having a management module 262 for calling the PCIE switch chip driver 24 to be analogized to a driver of the network interface card apparatus by using a modifying parameter setting in order to share the management module 262 with the PCIE switch chip driver 24 and the driver of the network interface card apparatus so that the server system invokes the driver of the network interface card apparatus for synchronizing the memory data of the at least one first memory module 214 of the first motherboard 21 with the memory data of the at least one second memory module 234 of the second motherboard 23. For example, the modifying parameter setting comprises a modifying bandwidth and a device identifier.

In one embodiment, the PCIE transmission channel 220 is compatible to PCIE Gen 3 protocol. In one case, the connection between the at least one first PCIE switch chip 222 and the at least one second PCIE switch chip 224 adopts PCIE Gen 3 "×4" of interface connection in form of four lanes by bandwidth 8G/s of each channel so that the bandwidth 20G/s of two NIC cards with 10G/s each is increased to 32G/s. In another case, the connection between the at least one first PCIE switch chip 222 and the at least one second PCIE switch chip 224 adopts PCIE Gen 3 "×8" (multiple widths) of interface connection in form of eight lanes by bandwidth 8G/s of each channel so that the bandwidth 20G/s of two NIC cards with 10G/s each is increased to 64G/s.

The server system of the present invention utilizes PCIE switch chips to directly interconnect two redundant motherboards to omit NIC cards with 10G/s. When the PCIE switch chips transmits PCIE packets, the data having target indication information are regarded as the first code or last code to be added to the end portion of the PCIE packets, which minimizes the change level of the PCIE packet. The server system of the present invention improves that the conventional PCIE packet data is regarded as general PCIE data and the general PCIE data are re-packaged to form network packets according to network packet protocol. The network packets in the server system of the present invention occupy fewer bits, which consumes few data transmission bandwidth, to minimize the network conversion delay during the transmission procedure. The server system effectively reduces the consumption of data transmission bandwidth, e.g. 20% of NIC bandwidth, without packet conversion during synchronization step of memory data. Further, there is no need to transform the network packets into PCIE packets in the following steps without the consumption of data transmission bandwidth.

Figure 3:
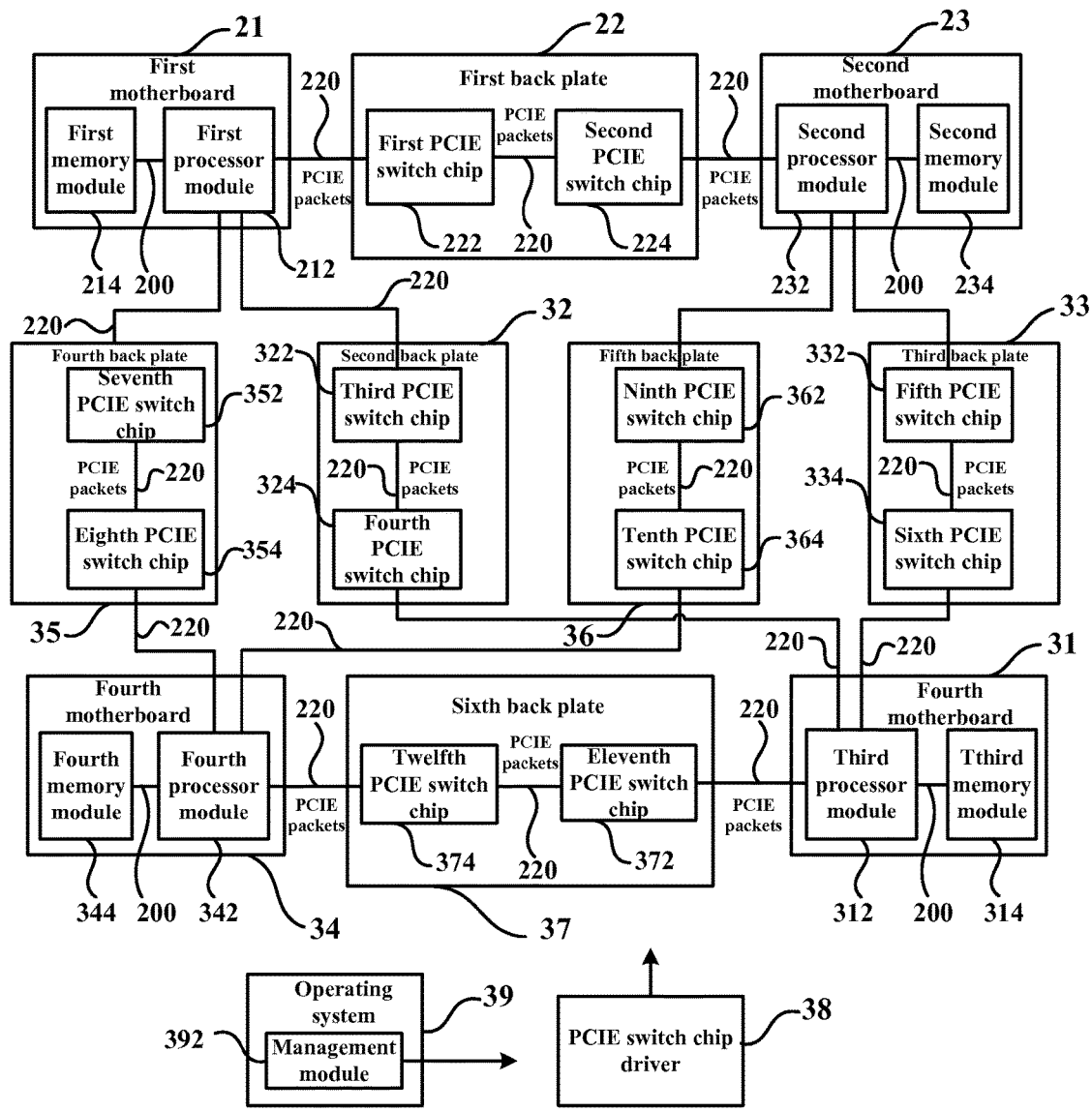
FIG. 3 is a schematic view of a cluster system according to another embodiment of the present invention.

FIG. 3 is a schematic view of a cluster system according to another embodiment of the present invention. The server system includes a first motherboard 21, a second motherboard 23, a third motherboard 31, a first back plate 22, a second back plate 32 and a third back plate 33. The connection relationships and components of the first motherboard 21, first back plate 22 and second motherboard 23 in FIG. 3 are the same as these in FIG. 2, which are omitted here.

The third motherboard 31 includes at least one third processor module 312 and at least one third memory module 314, wherein the at least one third processor module 312 is electrically coupled to the at least one third memory module 314 by way of the memory transmission channel 200. The second back plate 32 includes at least one third PCIE switch chip 322 and at least one fourth PCIE switch chip 324, wherein the at least one third PCIE switch chip 322 is electrically coupled to the at least one fourth PCIE switch chip 324 by way of the PCIE transmission channel 220. The third back plate 33 includes at least one fifth PCIE switch chip 332 and at least one sixth PCIE switch chip 334, wherein the at least one fifth PCIE switch chip 332 is electrically coupled to the at least one sixth PCIE switch chip 334 by way of the PCIE transmission channel 220.

The at least one first processor module 212 is electrically coupled to the at least one third PCIE switch chip 322 by way of the PCIE transmission channel 220. The at least one third processor module 312 is electrically coupled to the at least one fourth PCIE switch chip 324 by way of the PCIE transmission channel 220. The at least one first processor module 212 converts the memory data of the at least one first memory module 214 into PCIE packet data to be transmitted to the at least one third processor module 312 via the at least one third PCIE switch chip 322 and the at least one fourth PCIE switch chip 324 sequentially. The at least one third processor module 312 transforms the received PCIE packet data into the memory data of the at least one third memory module 314 for synchronizing the memory data of the at least one first memory module 214 of the first motherboard 21 with the memory data of the at least one third memory module 314 of the third motherboard 31. Similarly, the at least one third processor module 312 converts the memory data of the at least one third memory module 314 into PCIE packet data to be transmitted to the at least one first processor module 212 via the at least one fourth PCIE switch chip 324 and the at least one third PCIE switch chip 322 sequentially. The at least one first processor module 212 transforms the received PCIE packet data into the memory data of the at least one first memory module 214 for synchronizing the memory data of the at least one first memory module 214 of the first motherboard 21 with the memory data of the at least one third memory module 314 of the third motherboard 31.

The at least one second processor module 232 is electrically coupled to the at least one fifth PCIE switch chip 332 by way of the PCIE transmission channel 220. The at least one third processor module 312 is electrically coupled to the at least one sixth PCIE switch chip 334 by way of the PCIE transmission channel 220. The at least one second processor module 232 converts the memory data of the at least one second memory module 234 into PCIE packet data to be transmitted to the at least one third processor module 312 via the at least one fifth PCIE switch chip 332 and the at least one sixth PCIE switch chip 334 sequentially. The at least one third processor module 312 transforms the received PCIE packet data into the memory data of the at least one third memory module 312 for synchronizing the memory data of the at least one second memory module 234 of the second motherboard 23 with the memory data of the at least one third memory module 314 of the third motherboard 31. The at least one third processor module 312 converts the memory data of the at least one third memory module 314 into PCIE packet data to be transmitted to the at least one second processor module 232 via the at least one sixth PCIE switch chip 334 and the at least one fifth PCIE switch chip 332 sequentially. The at least one second processor module 232 transforms the received PCIE packet data into the memory data of the at least one second memory module 234 for synchronizing the memory data of the at least one second memory module 234 of the second motherboard 23 with the memory data of the at least one third memory module 314 of the third motherboard 31.

In one embodiment, the server system further includes a fourth motherboard 34, a fourth back plate 35, a fifth back plate 36 and a sixth back plate 37.

The fourth motherboard 34 includes at least one fourth processor module 342 and at least one fourth memory module 344, wherein the at least one fourth processor module 342 is electrically coupled to the at least one fourth memory module 344 by way of the memory transmission channel 200. The fourth back plate 34 includes at least one seventh PCIE switch chip 352 and at least one eighth PCIE switch chip 354, wherein the at least one seventh PCIE switch chip 352 is electrically coupled to the at least one eighth PCIE switch chip 354 by way of the PCIE transmission channel 220. The fifth back plate 36 includes at least one ninth PCIE switch chip 362 and at least one tenth PCIE switch chip 364, wherein the at least one ninth PCIE switch chip 362 is electrically coupled to the at least one tenth PCIE switch chip 364 by way of the PCIE transmission channel 220. The sixth back plate 37 includes at least one eleventh PCIE switch chip 372 and at least one twelfth PCIE switch chip 374, wherein the at least one eleventh PCIE switch chip 372 is electrically coupled to the at least one twelfth PCIE switch chip 374 by way of the PCIE transmission channel 220.

The at least one first processor module 212 is electrically coupled to the at least one seventh PCIE switch chip 352 by way of the PCIE transmission channel 220. The at least one fourth processor module 342 is electrically coupled to the at least one eighth PCIE switch chip 354 by way of the PCIE transmission channel 220. The at least one first processor module 212 converts the memory data of the at least one first memory module 214 into PCIE packet data to be transmitted to the at least one fourth processor module 342 via the at least one seventh PCIE switch chip 352 and the at least one eighth PCIE switch chip 354 sequentially. The at least one fourth processor module 342 transforms the received PCIE packet data into the memory data of the at least one fourth memory module 344 for synchronizing the memory data of the at least one first memory module 214 of the first motherboard 21 with the memory data of the at least one fourth memory module 334 of the fourth motherboard 34.

The at least one second processor module 232 is electrically coupled to the at least one ninth PCIE switch chip 362 by way of the PCIE transmission channel 220. The at least one fourth processor module 342 is electrically coupled to the at least one tenth PCIE switch chip 364 by way of the PCIE transmission channel 220. The at least one second processor module 232 converts the memory data of the at least one second memory module 234 into PCIE packet data to be transmitted to the at least one fourth processor module 342 via the at least one ninth PCIE switch chip 362 and the at least one tenth PCIE switch chip 364 sequentially. The at least one fourth processor module 342 transforms the received PCIE packet data into the memory data of the at least one fourth memory module 344 for synchronizing the memory data of the at least one second memory module 234 of the second motherboard 23 with the memory data of the at least one fourth memory module 344 of the fourth motherboard 31.

The at least one third processor module 312 is electrically coupled to the at least one eleventh PCIE switch chip 372 by way of the PCIE transmission channel 220. The at least one fourth processor module 342 is electrically coupled to the at least one twelfth PCIE switch chip 374 by way of the PCIE transmission channel 220. The at least one third processor module 312 converts the memory data of the at least one third memory module 314 into PCIE packet data to be transmitted to the at least one fourth processor module 342 via the at least one eleventh PCIE switch chip 372 and the at least one twelfth PCIE switch chip 374 sequentially. The at least one fourth processor module 342 transforms the received PCIE packet data into the memory data of the at least one fourth memory module 344 for synchronizing the memory data of the at least one third memory module 314 of the third motherboard 21 with the memory data of the at least one fourth memory module 344 of the fourth motherboard 34.

In one embodiment, the first motherboard 21, the second motherboard 23, the third motherboard 31 and the fourth motherboard 34 are mutually redundant. In other words, a plurality of motherboards employs the back plated to synchronize the memory data.

For example, the at least one first processor module 212, the at least one second processor module 232, the at least one third processor module 312, and the at least one fourth processor module 342 are a central processing unit (CPU) respectively. The at least one first processor module 212, the at least one second processor module 232, the at least one third processor module 312, and the at least one fourth processor module 342 include a PCIE control unit (not shown) respectively. The PCIE control unit is used to control transformation operation between the PCIE packet data and the memory data.

The server system further includes a PCIE switch chip driver 38 for analogizing the at least one first PCIE switch chip and/or the at least one second PCIE switch chip to a network interface card (NIC) apparatus.

In one embodiment, the server system further includes an operating system 39 having a management module 392 for calling the PCIE switch chip driver 38 to be analogized to a driver of the network interface card apparatus by using a modifying parameter setting in order to share the management module 392 with the PCIE switch chip driver 38 and the driver of the network interface card apparatus so that the server system invokes the driver of the network interface card apparatus for synchronizing the memory data of the motherboards. For example, the modifying parameter setting comprises a modifying bandwidth and a device identifier.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A server system, comprising:
a first motherboard having at least one first processor module and at least one first memory module, wherein the at least one first processor module is electrically coupled to the at least one first memory module by way of a memory transmission channel;
a second motherboard having at least one second processor module and at least one second memory module, wherein the at least one second processor module is electrically coupled to the at least one second memory module by way of a memory transmission channel;
a first back plate having at least one first peripheral component interconnect express (PCIE) switch chip and at least one second PCIE switch chip, wherein the at least one first PCIE switch chip is electrically coupled to the at least one second PCIE switch chip by way of a plurality of PCIE transmission channels;
wherein the at least one first processor module is electrically coupled to the at least one first PCIE switch chip by way of the PCIE transmission channels, the at least one second processor module is electrically coupled to the at least one second PCIE switch chip by way of the PCIE transmission channels, the at least one first processor module converts memory data of the at least one first memory module into PCIE packet data to be transmitted to the at least one second processor module via the at least one first PCIE switch chip and the at least one second PCIE switch chip sequentially, and the at least one second processor module transforms the received PCIE packet data into memory data of the at least one second memory module for synchronizing the memory data of the at least one first memory module of the first motherboard with the memory data of the at least one second memory module of the second motherboard;
a third motherboard having at least one third processor module and at least one third memory module, wherein the at least one third processor module is electrically coupled to the at least one third memory module by way of the memory transmission channel;
a second back plate having at least one third PCIE switch chip and at least one fourth PCIE switch chip, wherein the at least one third PCIE switch chip is electrically coupled to the at least one fourth PCIE switch chip by way of the PCIE transmission channel; and
a third back plate having at least one fifth PCIE switch chip and at least one sixth PCIE switch chip, wherein the at least one fifth PCIE switch chip is electrically coupled to the at least one sixth PCIE switch chip by way of the PCIE transmission channel;
wherein the at least one first processor module is electrically coupled to the at least one third PCIE switch chip by way of the PCIE transmission channel, the at least one third processor module is electrically coupled to the at least one fourth PCIE switch chip by way of the PCIE transmission channel, the at least one first processor module converts the memory data of the at least one first memory module into PCIE packet data to be transmitted to the at least one third processor module via the at least one third PCIE switch chip and the at least one fourth PCIE switch chip sequentially, and the at least one third processor module transforms the received PCIE packet data into the memory data of the at least one third memory module for synchronizing the memory data of the at least one first memory module of the first motherboard with the memory data of the at least one third memory module of the third motherboard; and wherein the at least one second processor module is electrically coupled to the at least one fifth PCIE switch chip by way of the PCIE transmission channel, the at least one third processor module is electrically coupled to the at least one sixth PCIE switch chip by way of the PCIE transmission channel, the at least one second processor module converts the memory data of the at least one second memory module into PCIE packet data to be transmitted to the at least one third processor module via the at least one fifth PCIE switch chip and the at least one sixth PCIE switch chip sequentially, and the at least one third processor module transforms the received PCIE packet data into the memory data of the at least one third memory module for synchronizing the memory data of the at least one second memory module of the second motherboard with the memory data of the at least one third memory module of the third motherboard.

2. The server system of claim 1, wherein the at least one second processor module converts memory data of the at least one second memory module into PCIE packet data to be transmitted to the at least one first processor module via the at least one second PCIE switch chip and the at least one first PCIE switch chip sequentially, and the at least one first processor module transforms the received PCIE packet data into memory data of the at least one first memory module for synchronizing the memory data of the at least one first memory module of the first motherboard with the memory data of the at least one second memory module of the second motherboard.

3. The server system of claim 1, wherein the at least one first processor module comprises a first PCIE control unit, the at least one second processor module comprises a second PCIE control unit, and the first PCIE control unit and the second PCIE control unit are used to control transformation operation between the PCIE packet data and the memory data.

4. The server system of claim 1, wherein the at least one first processor module and the at least one second processor module are a central processing unit (CPU) respectively.

5. The server system of claim 1, wherein the server system further comprises a PCIE switch chip driver for enabling the at least one first PCIE switch chip and/or the at least one second PCIE switch chip to perform communications therebetween to synchronize the memory data of the at least one first memory module with the memory data of the at least one second memory module.

6. The server system of claim 5, wherein the server system further comprises an operating system having a management module for calling the PCIE switch chip driver to be operated by using a modifying parameter setting in order to share the management module with the PCIE switch chip driver and the driver of the network interface card apparatus so that the server system invokes the driver of the network interface card apparatus for synchronizing the memory data of the at least one first memory module of the first motherboard with the memory data of the at least one second memory module of the second motherboard.

7. The server system of claim 6, wherein the modifying parameter setting comprises a modifying bandwidth and a device identifier.

8. The server system of claim 1, wherein the first motherboard and the second motherboard are mutually redundant.

9. The server system of claim 1, wherein the server system further comprises:

a fourth motherboard having at least one fourth processor module and at least one fourth memory module, wherein the at least one fourth processor module is electrically coupled to the at least one fourth memory module by way of the memory transmission channel;

a fourth back plate having at least one seventh PCIE switch chip and at least one eighth PCIE switch chip, wherein the at least one seventh PCIE switch chip is electrically coupled to the at least one eighth PCIE switch chip by way of the PCIE transmission channels;

a fifth back plate having at least one ninth PCIE switch chip and at least one tenth PCIE switch chip, wherein the at least one ninth PCIE switch chip is electrically coupled to the at least one tenth PCIE switch chip by way of the PCIE transmission channels; and a sixth back plate having at least one eleventh PCIE switch chip and at least one twelfth PCIE switch chip, wherein the at least one eleventh PCIE switch chip is electrically coupled to the at least one twelfth PCIE switch chip by way of the PCIE transmission channels;

wherein the at least one first processor module is electrically coupled to the at least one seventh PCIE switch chip by way of the PCIE transmission channels, the at least one fourth processor module is electrically coupled to the at least one eighth PCIE switch chip by way of the PCIE transmission channels, the at least one first processor module converts the memory data of the at least one first memory module into PCIE packet data to be transmitted to the at least one fourth processor module via the at least one seventh PCIE switch chip and the at least one eighth PCIE switch chip sequentially, and the at least one fourth processor module transforms the received PCIE packet data into the memory data of the at least one fourth memory module for synchronizing the memory data of the at least one first memory module of the first motherboard with the memory data of the at least one fourth memory module of the fourth motherboard;

wherein the at least one second processor module is electrically coupled to the at least one ninth PCIE switch chip by way of the PCIE transmission channels, the at least one fourth processor module is electrically coupled to the at least one tenth PCIE switch chip by way of the PCIE transmission channels, the at least one second processor module converts the memory data of the at least one second memory module into PCIE packet data to be transmitted to the at least one fourth processor module via the at least one ninth PCIE switch chip and the at least one tenth PCIE switch chip sequentially, and the at least one fourth processor module transforms the received PCIE packet data into the memory data of the at least one fourth memory module for synchronizing the memory data of the at least one second memory module of the second motherboard with the memory data of the at least one fourth memory module of the fourth motherboard; and wherein the at least one third processor module is electrically coupled to the at least one eleventh PCIE switch chip by way of the PCIE transmission channels, the at least one fourth processor module is electrically coupled to the at least one twelfth PCIE switch chip by way of the PCIE transmission channels, the at least one third processor module converts the memory data of the at least one third memory module into PCIE packet data to be transmitted to the at least one fourth processor module via the at least one eleventh PCIE switch chip and the at least one twelfth PCIE switch chip sequentially, and the at least one fourth processor module transforms the received PCIE packet data into the memory data of the at least one fourth memory module for synchronizing the memory data of the at least one third memory module of the third motherboard with the memory data of the at least one fourth memory module of the fourth motherboard.

\* \* \* \* \*